(12) United States Patent
He et al.

(10) Patent No.: US 11,229,939 B1
(45) Date of Patent: Jan. 25, 2022

(54) METHOD FOR MANUFACTURING CURVED THIN-WALLED INTERMETALLIC COMPOUND COMPONENT BY WINDING MANDREL WITH METAL FOIL STRIPS

(71) Applicant: DALIAN UNIVERSITY OF TECHNOLOGY, Liaoning (CN)

(72) Inventors: Zhubin He, Liaoning (CN); Yi Xu, Liaoning (CN); Jiangkai Liang, Liaoning (CN); Ying Sun, Liaoning (CN); Shijian Yuan, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/350,826

(22) Filed: Jun. 17, 2021

(30) Foreign Application Priority Data

Aug. 13, 2020 (CN) .......................... 202010811707.6

(51) Int. Cl.
*B21D 26/027* (2011.01)
*B21D 37/16* (2006.01)
(Continued)

(52) U.S. Cl.
CPC ......... *B21D 26/027* (2013.01); *B21D 26/053* (2013.01); *B21D 37/16* (2013.01);
(Continued)

(58) Field of Classification Search
USPC ........................................................ 148/535
See application file for complete search history.

(56) References Cited

U.S. PATENT DOCUMENTS 4,941,928 A * 7/1990 Ammon .................... C22C 1/02
148/552

FOREIGN PATENT DOCUMENTS

| CN | 111168407 A | 5/2000 |
| CN | 107081345 A | 8/2017 |

OTHER PUBLICATIONS

Office Action (with English translation) corresponding to Chinese application No. 202010811707.6 dated Apr. 2, 2021. (pp. 15).
(Continued)

*Primary Examiner* — Brian D Walck
(74) *Attorney, Agent, or Firm* — Muncy, Geissler, Olds & Lowe, P.C.

(57) ABSTRACT

The present invention provides a method for manufacturing a curved thin-walled intermetallic compound component by winding a mandrel with metal foil strips, which comprises the following steps: designing a prefabricated blank; preparing a support mandrel; determining thicknesses and layer numbers of foil strips; determining widths of the foil strips; establishing a laying process; pretreating surfaces of the foil strips; laying A foil and B foil; carrying out bulge forming on the prefabricated blank; carrying out diffusion reaction and densification treatment on a bulged component; and carrying out subsequent treatment of a thin-walled component. The present invention can solve the problems that impurities generated in the separation process of a support mould and a laminated foil prefabricated blank influence the final performance of a part, and a single homogeneous intermetallic compound component in thickness direction has poor plasticity and toughness at room temperature.

1 Claim, 5 Drawing Sheets

(51) Int. Cl.
*B21D 26/053* (2011.01)
*C23C 10/28* (2006.01)
*C23C 26/00* (2006.01)
*C21D 9/52* (2006.01)
*C22C 19/03* (2006.01)
*C22C 14/00* (2006.01)

(52) U.S. Cl.
CPC ................ *C21D 9/52* (2013.01); *C22C 19/03* (2013.01); *C23C 10/28* (2013.01); *C23C 26/00* (2013.01); *C22C 14/00* (2013.01)

(56) References Cited

OTHER PUBLICATIONS

Notification of Grant (with English translation) corresponding Chinese application No. 202010811707.6 dated Apr. 28, 2021. (pp. 5).

* cited by examiner

METHOD FOR MANUFACTURING CURVED THIN-WALLED INTERMETALLIC COMPOUND COMPONENT BY WINDING MANDREL WITH METAL FOIL STRIPS

TECHNICAL FIELD

The present invention relates to a method for manufacturing a curved thin-walled intermetallic compound component, and more particularly to a method for manufacturing a curved thin-walled intermetallic compound component by winding a mandrel with metal foil strips.

BACKGROUND

With the progress of aerospace science and technology, in order to meet the development requirements of high Mach number, high performance and high reliability of a new generation of aircraft and engines thereof, the demand of lightweight and high temperature resistant curved surface thin-walled components, especially important components such as skins and turbine guide vanes of aero-engines, is increasing. In face of higher service temperature and more severe operating conditions, common titanium alloys cannot meet the operational requirements, whereas nickel-based high temperature alloys are easy to cause the problem of structure overweight because of high density. Therefore, new types of lightweight and high temperature resistant structural materials such as NiAl/TiAl alloy have gradually become hot research topics. The service temperature of TiAl is 600° C.-850° C., and the service temperature of NiAl is as high as 900° C.-1000° C.; in addition, the melting point of NiAl alloy is about 300° C. higher than that of a nickel-based high temperature alloy, but the density is only ⅔ of that of the nickel-based high temperature alloy; therefore, NiAl/TiAl alloy is an ideal high temperature resistant structural material having properties between those of a high temperature alloy and those of a ceramic material. Besides the high temperature resistance and low density, NiAl/TiAl intermetallic compound also has the characteristics of excellent oxidation resistance, good corrosion resistance, high structural stability, etc.

For a curved surface thin-walled NiAl/TiAl alloy component, common manufacturing methods at present are to prepare a NiAl/TiAl alloy sheet first, and then carry out superplastic forming at a temperature higher than 1000° C. to obtain a curved surface thin-walled component. The preparation of the NiAl/TiAl alloy sheet and the subsequent forming & manufacturing of the curved surface thin-walled component are two relatively independent processes which have some problems: on one hand, due to the large intrinsic brittleness at room temperature, NiAl/TiAl alloy is a material that is difficult to have thermoplastic deformation, and due to the fact that many constraints related to plate rolling are imposed and the thermal strain state of the material is very complex in a rolling process, the NiAl/TiAl alloy sheet is easy to crack in the rolling process, and it is very difficult to obtain a large-size and high-quality sheet; on the other hand, as a superplastic forming process has high requirements on forming equipment and microstructure, and the deformation of the material in the forming process is large, micro cavities are easy to appear after forming, which leads to poor structural properties, and large deformation can also cause severe thinning of wall thickness, what's more, as the strain rate is relatively low during forming, the production efficiency is reduced, and the application thereof is limited to a certain extent; in addition, as sheet preparation and forming are carried out separately, the production procedures are increased, the production efficiency is reduced, and the production cost is increased. In order to solve the problems, a patent for invention (CN111168407A) proposes an integrated method for synthesis, preparation and forming of a curved NiAl alloy sheet component, which is to stack large-size Ni foil and Al foil alternately to make a blank by hot pressing first, then obtain a component shape by hot gas bulging forming, and subsequently obtain a final curved NiAl alloy part through steps such as high-temperature vacuum heat treatment. As the method is to prepare a simple sheet of laminated Ni/Al foils first, the sheet will have a large and complex deformation when the component shape is obtained by hot bulging, and as the deformation will occur in the normal direction of the sheet, complex interfacial interactions between layers may occur, which may finally lead to the problems such as local thinning, cracking and wrinkling. Therefore, it is still difficult to manufacture a thin-walled component with a complex shape and uniform wall thickness by using the above method. In order to reduce the above defects, a patent for invention (CN111168407A) proposes an integrated method for manufacturing a high temperature resistant thin-walled component by laying metal foil strips to make a blank, which is to use foamed plastics to make a support mould, lay metal foil strips on the support mould with a shape close to that of a final part to prepare a laminated foil prefabricated blank, then separate the laminated foil prefabricated blank from the support mould, and subsequently carry out bulging and diffusion reaction on the laminated foil prefabricated blank to obtain a final component, wherein the material of the final component is NiAl alloy. A certain amount of impurities will remain in the process of separating the support mould from the laminated foil prefabricated blank at high temperature, which will bring great defects to the subsequent bulge forming, diffusion reaction and densification treatment of the laminated foil prefabricated blank, and ultimately influence the mechanical properties of the material. In addition, due to the brittleness of NiAl alloy at room temperature, the plasticity and toughness of a single homogeneous intermetallic compound component are poor, which will influence the service performance and service life of the final component.

In order to solve the problems that the impurities generated in the process of separating the support mould made of foamed plastics from the laminated foil prefabricated blank influence the final properties of a part, and an intermetallic compound component which is single homogeneous along the thickness direction has poor plasticity and toughness at room temperature, it is necessary to develop a new method for manufacturing a composite structure curved thin-walled component.

SUMMARY

The purpose of the present invention is to provide a method for preparing a curved thin-walled intermetallic compound component by winding a mandrel with metal foil strips, so as to solve the problems that the impurities generated in the process of separating the support mould made of foamed plastics from the laminated foil prefabricated blank influence the final properties of a part, and an intermetallic compound component which is single homogeneous along the thickness direction has poor plasticity and toughness at room temperature.

The technical solution of the present invention is as follows:

A method for preparing a curved thin-walled intermetallic compound component by winding a mandrel with metal foil strips, comprising the following steps:

Step 1, designing a prefabricated blank. Carrying out characteristic analysis on a curved thin-walled component to determine shape of a thin-walled prefabricated blank required with theoretical calculation, simulation or other approaches;

Step 2, preparing a support mandrel. Determining material of the internal support mandrel required, which is Ni or Ti, and preparing a complex curved surface mandrel according to the shape of the prefabricated blank determined in step 1;

Step 3, determining thicknesses and layer numbers of foil strips. Determining total thickness ratio of A foil strips to B foil strips according to atom number ratio of A atoms to B atoms in an intermetallic compound AxBy, wherein A is Ni or Ti, and B is Al; determining total thicknesses of the A foil strips and the B foil strips according to wall thickness of the curved thin-walled component to be finally formed and thickness of the support mandrel; when determining laying sequence of the foil strips, it is necessary to consider the internal support mandrel; as the material of the mandrel is A (Ni or Ti) which has better properties, in order to increase the bonding degree of the support mandrel and a laminated foil prefabricated blank, the material adjacent to the surface layer foil strips of the mandrel is B (Al), in order to make Al react completely, the material of the outermost layer is A, and the materials determined in sequence from inside out and starting from the surface layer of the support mandrel are B, A, B . . . A; assuming that the layer number of A foil used is n, then the layer number of B foil used is also n, and the value of n depends on the ratio of respective total thickness to respective single layer thickness of the A foil strips and the B foil strips;

Step 4, determining widths of the foil strips. Carrying out three-dimensional scanning on the curved thin-walled component to obtain the shape of surface contour thereof, then performing curvature analysis on each characteristic region of the surface contour thereof to determine the applicable widths of a single layer of A foil strips and a single layer of B foil strips in each characteristic region; for a simple characteristic region, wide metal foil strips can be adopted; for a complex local characteristic region, narrow metal foil strips are adopted; and when necessary, even metal filaments are adopted;

Step 5, establishing a laying process. Establishing a laying sequence according to the laying sequence and layer numbers of the A foil strips and the B foil strips determined in step 3, and establishing a laying path of each layer of foil strips according to the thicknesses of a single layer of A foil strips and a single layer of B foil strips determined in step 3 and step 4 as well as the widths of a single layer of A foil strips and a single layer of B foil strips in each characteristic region;

Step 6, pretreating surfaces of the foil strips. The surfaces of the foil strips shall be pretreated before laying of the foil strips; first, the surfaces of the A foil and the B foil are scrubbed with organic solvent, then the A foil is acid washed, and the B foil is alkaline washed;

Step 7, laying A foil and B foil. Alternately laying the foils on the surface layer of the support mandrel in sequence according to the laying process established in step 5, so that a laminated foil prefabricated blank with an internal support mandrel is obtained;

Step 8, carrying out bulge forming on the prefabricated blank. Placing the laminated foil prefabricated blank with an internal support mandrel in a bulge forming mould and carrying out bulge forming, so as to make the laminated foil prefabricated blank fully fayed with the mould to obtain a required component shape;

Step 9, carrying out reaction synthesis and densification treatment on a bulged component. Carrying out diffusion synthesis reaction and densification treatment on a laminated foil component with an internal support mandrel at high temperature and high pressure, so that a complex curved surface thin-walled component is obtained, and the material thereof is Ni—NiAl or Ti—TiAl; and Step 10, carrying out subsequent treatment of the thin-walled component. Carrying out necessary treatment on ends and surface of the formed Ni—NiAl or Ti—TiAl composite structure curved surface thin-walled component.

The present invention has the following beneficial effects:

(1) According to the method for manufacturing a curved thin-walled intermetallic compound component by winding a mandrel with metal foil strips of the present invention, the internal support mandrel used is an Ni plate or Ti plate with a certain thickness and a good plasticity, and the internal support mandrel is not taken out in the subsequent forming process; the internal support mandrel and the laminated foil prefabricated blank are used as a whole to carry out subsequent bulge forming and diffusion reaction synthesis, so as to improve the plastic deformation capability and mechanical properties of an integral laminated foil component.

(2) According to the method for manufacturing a curved thin-walled intermetallic compound component by winding a mandrel with metal foil strips of the present invention, in the process of laying A (Ni or Ti) foil, in order to have A in the middle region, A foil with a variable thickness can be used, and the product obtained after reaction synthesis is as follows: the innermost layer is A, the middle region is AxBy and A in alternation, and the outermost layer is A or AxBy; compared with AxBy alloy prepared by the same process, the ductility and toughness of A-AxBy laminated structure alloy at room temperature are obviously higher than those of the AxBy alloy.

(3) According to the method for manufacturing a curved thin-walled intermetallic compound component by winding a mandrel with metal foil strips of the present invention, foil strips with appropriate widths are laid alternately on the surface layer of the support mandrel (wherein the shape of the support mandrel is close to that of a component to be finally formed), so that a thin-walled integral prefabricated blank with a complex structure, a uniform wall thickness and a shape close to that of a final part can be obtained, the deformation in subsequent bulging is reduced, and the defects such as local thinning, cracking, or wrinkling caused by uneven distribution of materials on cross section are avoided.

(4) According to the method for manufacturing a curved thin-walled intermetallic compound component by winding a mandrel with metal foil strips of the present invention, in the process of laying the foil strips, different clearances or overlapping modes are used in the same layer of foil strips and between adjacent layers of foil strips, so that the material distribution is more reasonable, and the reaction will not be incomplete due to local lack of A (Ni or Ti) or B (Al) in subsequent diffusion synthesis reaction.

Figure 1:
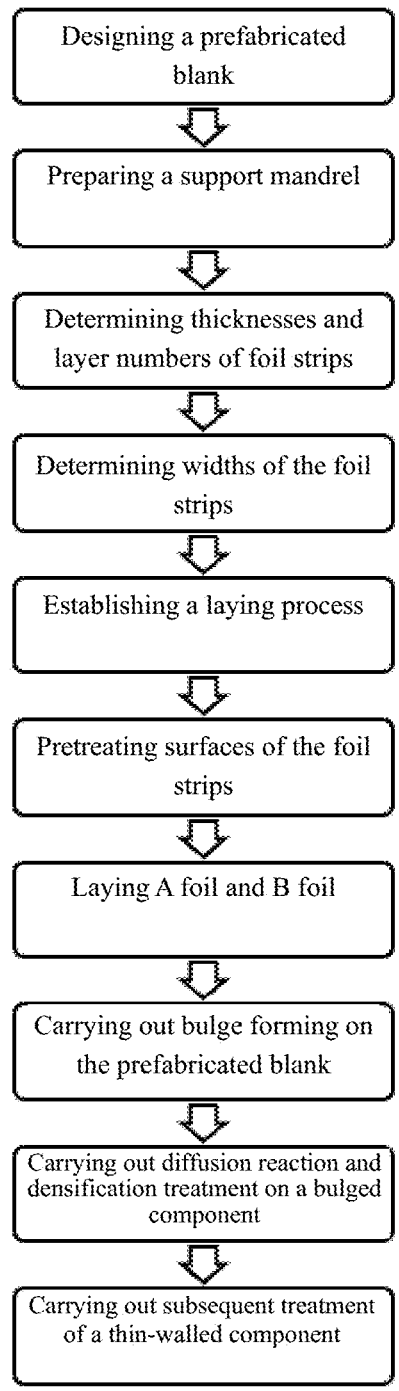
FIG. 1 is a schematic diagram of a method for manufacturing a curved thin-walled intermetallic compound component by winding a mandrel with metal foil strips of the present invention.

In the figures: 1 internal support mandrel; 2 B foil strip; 3 clearance region; 4 A foil strip; 5 overlapping region; 6 metal foil strip; 7 laminated foil preforming; 8 press; 9 upper bolster; 10 upper water-cooling plate for bulging; 11 upper heat shield for bulging; 12 upper die for bulging; 13 lower die for bulging; 14 lower water-cooling plate for bulging; 15 lower bolster; 16 industrial water chiller; 17 pressurization control system; 18 heater; 19 lower heat shield for bulging; and 20 formed curved thin-walled component.

DETAILED DESCRIPTION

Specific embodiments of the present invention are further described below in combination with the drawings and the technical solution.

Embodiment 1: referring to FIG. 1, FIG. 2, FIG. 3, FIG. 4, FIG. 5, FIG. 6, FIG. 7 and FIG. 8, a method for manufacturing a curved thin-walled intermetallic compound component by winding a mandrel with metal foil strips proposed by the present invention, which is implemented by the following steps:

Step 1, designing a prefabricated blank. Carrying out characteristic analysis on a curved thin-walled component to determine shape of a thin-walled prefabricated blank required with theoretical calculation, simulation or other approaches;

Step 2, preparing a support mandrel. Determining material of the internal support mandrel required, which is Ni, and preparing a complex curved surface mandrel according to the shape of the prefabricated blank determined in step 1;

Step 3, determining thicknesses and layer numbers of foil strips. Determining total thickness ratio of Ni foil to Al foil according to atom number ratio of Ni atoms to Al atoms in an intermetallic compound NiAl; determining total thicknesses of the Ni foil and the Al foil according to wall thickness of the curved thin-walled component to be finally formed and thickness of the support mandrel; when determining laying sequence of the foil strips, it is necessary to consider the internal support mandrel; as the material of the mandrel is Ni which has better properties, in order to increase the bonding degree of the support mandrel and a laminated foil prefabricated blank, the material adjacent to the surface layer foil strips of the mandrel is Al, in order to make Al react completely, the material of the outermost layer is Ni, and the materials determined in sequence from inside out and starting from the surface layer of the support mandrel are Al, Ni, Al . . . Ni; assuming that the layer number of A foil used is n, then the layer number of B foil used is also n, and the value of n depends on the ratio of respective total thickness to respective single layer thickness of the A foil strips and the B foil strips; as the layer numbers of the Ni foil and the Al foil are the same, the total thickness ratio of Ni foil to Al foil is equal to the single layer thickness ratio of the two, wherein the total thickness ratio of Ni foil to Al foil is specifically calculated as follows:

$$N = n \cdot N_A \tag{1}$$

wherein N represents atom number, n represents amount of substance, and $N_A$ represents Avogadro constant;

$$m = n \cdot M \tag{2}$$

wherein m represents mass, n represents amount of substance, and M represents molar mass of substance;

$$h = \frac{m}{\rho \cdot S} \tag{3}$$

$h = m/\rho \cdot S$ wherein h represents height, m represents mass, $\rho$ represents density, and S represents cross-sectional area;

Given that: $\rho_{Ni}=8.902$ g/cm$^3$; $M_{Ni}=58.69$ g/mol; $\rho_A=2.70$ g/cm$^3$; and $M_{Al}=26.98$ g/mol;

As $N_{Ni}:N_{Al}=1:1$, and according to the formulas (1), (2) and (3), it can be obtained that: $h_{Ni}:h_{Al} \approx 1.5$, the thickness of the Ni foil used in the method is 0.06 mm, and the thickness of the Al foil is 0.1 mm;

Step 4, determining widths of the foil strips. Carrying out three-dimensional scanning on the curved thin-walled component to obtain the shape of surface contour thereof, then performing curvature analysis on each characteristic region of the surface contour thereof to determine the applicable widths of a single layer of Ni foil and a single layer of Al foil in each characteristic region; for a simple characteristic region, wide metal foil strips can be adopted; for a complex local characteristic region, narrow metal foil strips are adopted; and when necessary, even metal filaments are adopted;

Step 5, establishing a laying process. Establishing a laying sequence according to the laying sequence and layer numbers of the Ni foil and the Al foil determined in step 3, and establishing a laying path of each layer of foil strips according to the thicknesses of a single layer of Ni foil and a single layer of Al foil determined in step 3 and step 4 as well as the widths of a single layer of Ni foil and a single layer of Al foil in each characteristic region;

Step 6, pretreating surfaces of the foil strips. The surfaces of the foil strips shall be pretreated before laying of the foil strips; first, the surfaces of the Ni foil and the Al foil are scrubbed with organic solvent, then the Ni foil is acid washed, and the Al foil is alkaline washed;

Step 7, laying Ni foil and Al foil. Alternately laying the foils on the surface layer of the support mandrel in sequence according to the laying process established in step 5, so that a laminated foil prefabricated blank with an internal support mandrel is obtained;

Step 8, carrying out bulge forming on the prefabricated blank. Placing the laminated foil prefabricated blank with an internal support mandrel in a bulge forming mould and carrying out bulge deforming, so as to make the laminated foil prefabricated blank fully fayed with the mould to obtain a required component shape;

Step 9, carrying out reaction synthesis and densification treatment on a bulged component. Carrying out diffusion synthesis reaction and densification treatment on a laminated foil component with an internal support mandrel at high temperature and high pressure, so that a complex curved surface thin-walled component is obtained, and the material thereof is Ni—NiAl; and Step 10, carrying out subsequent treatment of the thin-walled component. Carrying out necessary treatment on ends and surface of the formed Ni—NiAl composite structure curved surface thin-walled component.

The embodiment has the following beneficial effects: according to the method for preparing a curved thin-walled intermetallic compound component by winding a mandrel with metal foil strips, the internal support mandrel used is an Ni plate with a certain thickness and a good plasticity, and the internal support mandrel is not taken out in the subsequent forming process; the internal support mandrel and the laminated foil prefabricated blank are used as a whole to carry out subsequent bulge forming and diffusion reaction, so as to improve the plastic deformation capability and mechanical properties of an integral laminated foil component. In the process of laying Ni foil, in order to have Ni in the middle region, Ni foil with a variable thickness can be used, and the product obtained after reaction synthesis is as follows: the innermost layer is Ni, the middle region is NiAl and Ni in alternation, and the outermost layer is Ni or NiAl; compared with NiAl alloy prepared by the same process, the ductility and toughness of Ni—NiAl laminated structure alloy at room temperature are obviously higher than those of the NiAl alloy. In addition, in the process of laying the foil strips, different clearances or overlapping modes are used in the same layer of foil strips and between adjacent layers of foil strips, so that the material distribution is more reasonable, and the reaction will not be incomplete due to local lack of Ni or Al in subsequent diffusion synthesis reaction.

Figure 2:
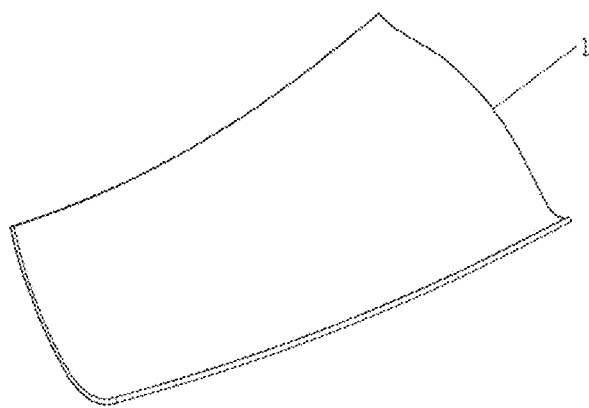
FIG. 2 is a schematic diagram of an internal support mandrel of the present invention.

Embodiment 2: referring to FIG. 2, in step 2, the internal support mandrel used is an Ni plate with a certain thickness and a good plasticity. The shape and the size of the support mandrel sheet are determined by the approaches of FEM reverse simulation and slab expansion calculation. Other steps are the same as those in embodiment 1.

The embodiment has the following beneficial effects: the internal support mandrel used is an Ni plate with a certain thickness and a good plasticity, and the internal support mandrel is not taken out in the subsequent forming process; the internal support mandrel and the laminated foil prefabricated blank are used as a whole to carry out subsequent bulge forming and diffusion reaction, so as to improve the plastic deformation capability and mechanical properties of an integral laminated foil component.

Embodiment 3: referring to FIG. 3, in step 5, the scheme for dispersed and laminated laying of metal foil strips used is as follows: the same layer of foil strips are laid by clearances, adjacent layers of foil strips are covered and laid by staggered clearances, and the clearances between adjacent foil strips of a single layer are filled with Ni powder or Al powder. Other steps are the same as those in embodiment 1.

The embodiment has the following beneficial effects: when the scheme of laying by clearances is used, the clearances can be filled with Ni powder or Al powder, and it can be guaranteed that a uniform alloy material is produced by the reaction of the Ni powder and the Al powder, so that the material distribution is more reasonable, and the reaction will not be incomplete due to local lack of Ni or Al in subsequent diffusion reaction.

Embodiment 4: referring to FIG. 4, in step 5, the scheme for dispersed and laminated laying of metal foil strips used is as follows: the same layer of foil strips are laid by overlapping, and adjacent layers of foil strips are covered and laid by staggered overlapping. Other steps are the same as those in embodiment 1.

The embodiment has the following beneficial effects: laying the same layer of foil strips by overlapping will make the thicknesses of wound layers more uniform; as half of the width of an overlapping foil strip is always pressed on a newly wound foil strip, and half of a subsequently wound foil strip always slides towards a low-lying part of the previously wound foil strip, the thicknesses of the two layers of foil strips tend to be uniform. Adjacent layers of foil strips are covered and laid by staggered overlapping, and overlapping intersection positions formed by the laying of an inner layer of foil strips are just covered by the adjacent layers of foil strips that are covered and laid, so that defects caused by unreasonable material distribution at the overlapping intersection positions of the inner layer can be reduced.

Figure 3A:
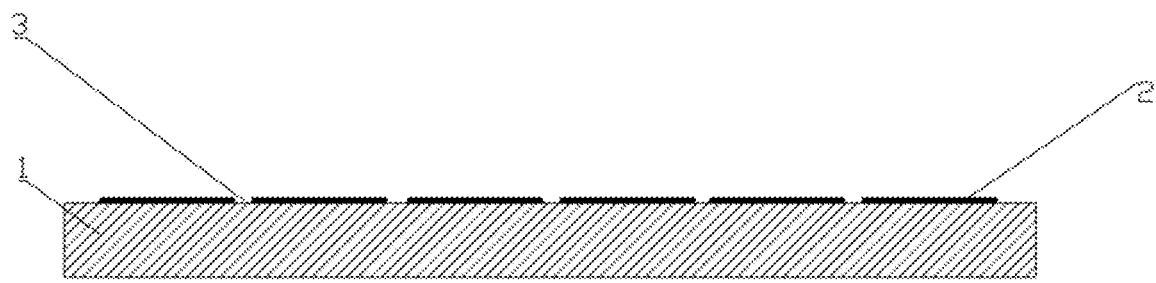
FIGS. 3(a) and 3(b) are schematic diagrams of a scheme 1 for dispersed and laminated laying of metal foil strips of the present invention, (a) is a schematic diagram of laying the same layer of foil strips by clearances, and (b) is a schematic diagram of covering and laying adjacent layers of foil strips by staggered clearances.
Figure 3B:
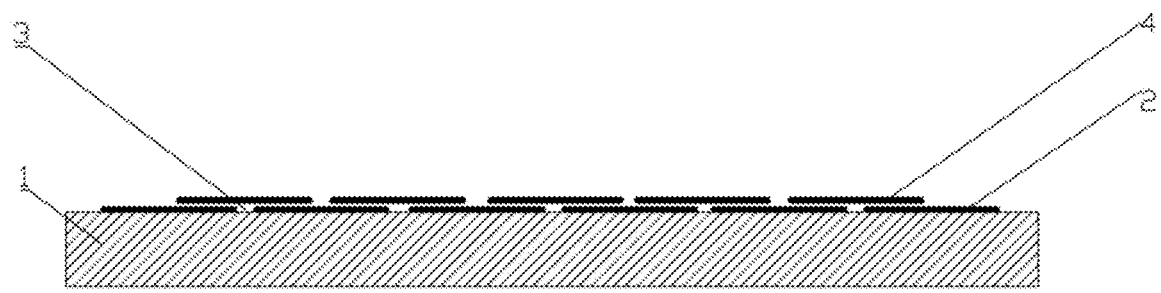
Figure 4A:
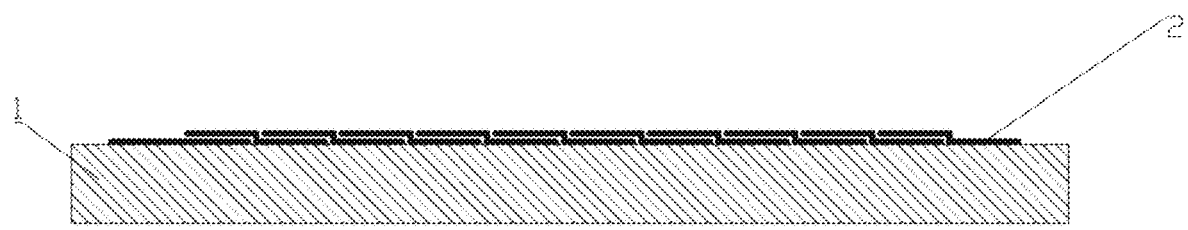
FIGS. 4(a) and 4(b) are schematic diagrams of a scheme 2 for dispersed and laminated laying of metal foil strips of the present invention, (a) is a schematic diagram of laying the same layer of foil strips by overlapping, and (b) is a schematic diagram of covering and laying adjacent layers of foil strips by staggered overlapping.
Figure 4B:
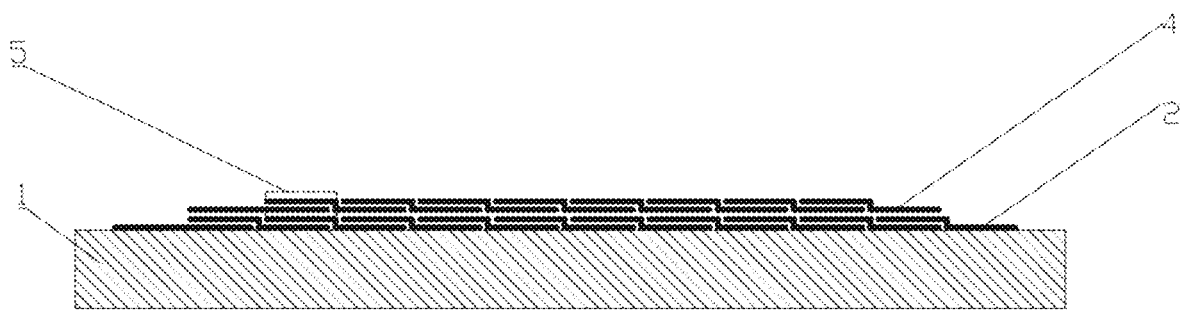

Embodiment 5: referring to FIGS. 3 and 4, in step 5, in the process of laying Ni foil, Ni foil with a variable thickness can be used, and the thickness of Al foil keeps unchanged. Other steps are the same as those in embodiment 1.

The embodiment has the following beneficial effects: after the diffusion reaction synthesis of Ni foil with a variable thickness and Al foil with a constant thickness at high temperature and high pressure, the Al foil will react completely, and the product obtained after reaction is as follows: the innermost layer is Ni, the middle region is NiAl and Ni in alternation, and the outermost layer is Ni or NiAl; compared with NiAl alloy prepared by the same process, the ductility and toughness of Ni—NiAl laminated structure alloy at room temperature are obviously higher than those of the NiAl alloy.

Figure 5:
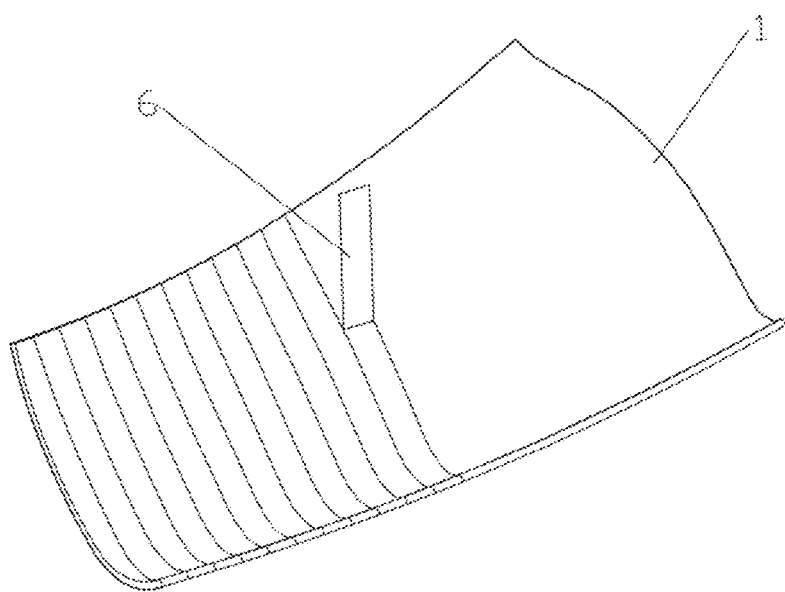
FIG. 5 is a schematic diagram of laying metal foil strips of the present invention.
Figure 6:
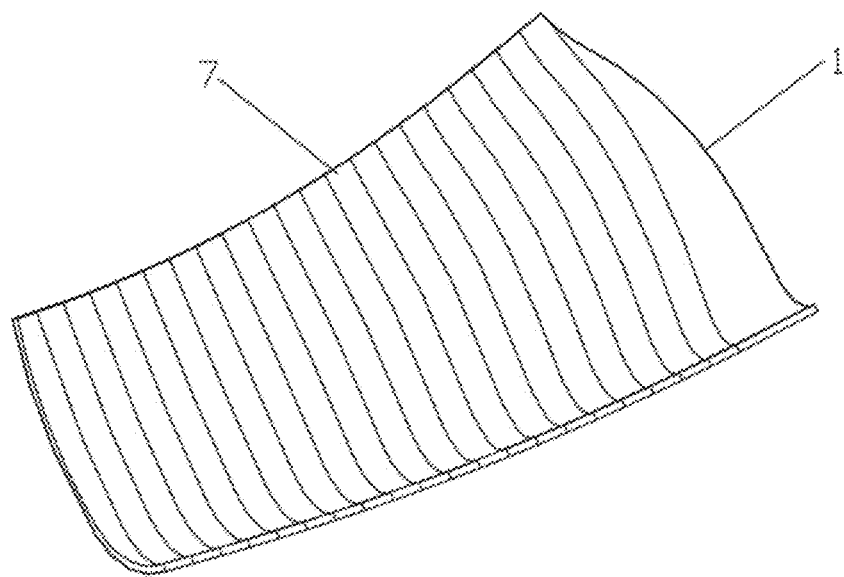
FIG. 6 is a schematic diagram of a laminated foil prefabricated blank with an internal support mandrel obtained after laying of metal foil strips of the present invention.

Embodiment 6: referring to FIG. 5, in step 6, the process for pretreating surfaces of the foil strips is as follows: first, the surfaces of the Ni foil and the Al foil are scrubbed with acetone to remove oil stains, then the Ni foil is immersed in 5% HF aqueous solution and soaked for 15 seconds, and next, the Ni foil is rinsed with clean water and dried by blowing; the Al foil is immersed in 10% NaOH aqueous solution and soaked for 20 seconds, then the Al foil is rinsed with clean water and dried by blowing, and thus the surface treatment is finished. Other steps are the same as those in embodiment 1.

The embodiment has the following beneficial effects: the purpose of acid washing the Ni foil and alkaline washing the Al foil is to remove the oxide layers, oil stains, dirt and the like on the surfaces of the foils, so as to expose pure metal matrices, and provide fresh surfaces for subsequent bulge forming and diffusion reaction.

Figure 7:
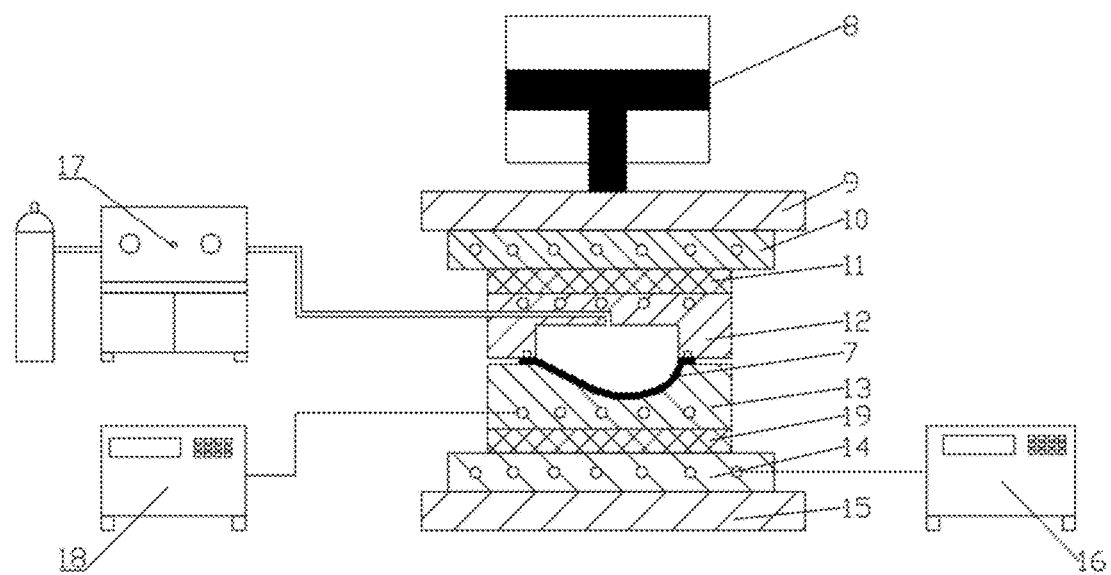
FIG. 7 is a schematic diagram of a device used for forming and reaction during preparation of a curved surface thin-walled component of the present invention.

Embodiment 7: referring to FIG. 7, in steps 8 and 9, a diagram of a device used for bulge forming, diffusion reaction and densification treatment of the laminated foil component is designed. First, the laminated prefabricated blank is placed in a forming mould for bulge forming to obtain a bulged component with a shape close to that of a final part, and then diffusion reaction and densification treatment are carried out at high temperature and high pressure as follows: first, carrying out the first reaction, which is to heat the gas bulging forming mould to 610° C.-650° C., increase gas pressure to 10-20 MPa, and keep the temperature and the pressure for 2-5 hours; next, carrying out the second reaction, which is to heat the gas bulging forming mould to 1000° C.-1300° C., increase gas pressure to 10-50 MPa, and keep the temperature and the pressure for 2-4 hours; finally, carrying out densification treatment, which is to heat the forming mould to 1000° C.-1300° C., increase gas pressure to 50-100 MPa, and keep the temperature and the pressure for 1-5 hours, so that a complex curved surface thin-walled component is obtained, and the material thereof is the compound of Ni—NiAl. Other steps are the same as those in embodiment 1.

The embodiment has the following beneficial effects: bulge forming, diffusion reaction and densification treatment are carried out successively in the same mould, which can effectively avoid the reduction of dimensional accuracy caused by transfer of a thin-walled component, and can also reduce the working procedures and effectively improve the production efficiency; in addition, the densification treatment is carried out in the gas bulging forming mould, which can effectively reduce the operating requirements on a heat treatment furnace for a large-size thin-walled curved plate component, and can obviously improve the dimensional accuracy of the Ni—NiAl composite structure curved surface thin-walled component.

Figure 8:
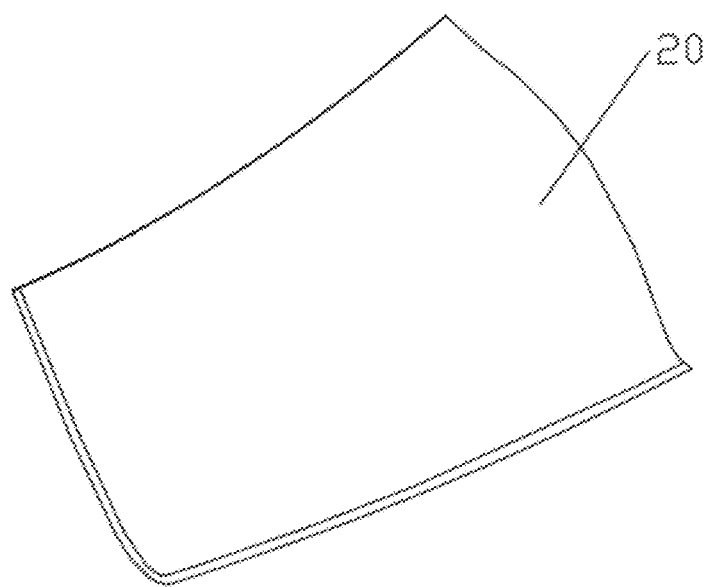
FIG. 8 is a schematic diagram of a curved thin-walled intermetallic compound component manufactured by the present invention.

Embodiment 8: referring to FIG. 8, in step 10, after the diffusion reaction and densification treatment of the laminated foil component, local process material of the formed curved thin-walled component is cut out by wire cutting, the surface and ends of the thin-walled component are polished with fine sandpaper, and then the surface thereof is rinsed and dried by blowing. Other steps are the same as those in embodiment 1.

The embodiment has the following beneficial effects: as local process material is removed by wire cutting, the machining allowance is small, the accuracy is high, the production cost is low, and valuable materials can be effectively saved; the ends and surface of the component are polished with fine sandpaper, which can improve the dimensional accuracy and geometric shape accuracy of the component, and make the surface smoother.

The invention claimed is:

1. A method for manufacturing a curved intermetallic compound component by winding a mandrel with metal foil strips, comprising the following steps:
   step 1, designing prefabricated blank: carrying out characteristic analysis on a curved component to determine shape of a prefabricated blank required;
   step 2, preparing an internal support mandrel: determining material of an internal support mandrel required, and preparing the internal support mandrel according to the shape of the prefabricated blank determined in step 1;
   step 3, determining thicknesses and layer numbers of foil strips: determining total thickness ratio of A foil strips to B foil strips according to atom number ratio of A atoms to B atoms in an intermetallic compound AxBy, wherein A is Ni or Ti, and B is Al; determining total thicknesses of the A foil strips and the B foil strips according to wall thickness of the curved component to be finally formed and thickness of the internal support mandrel; determining laying sequence of the foil strips based on the internal support mandrel; A is the material of the internal support mandrel for increasing the bonding degree of the internal support mandrel and a laminated foil prefabricated blank, B is the material of the foil strips which is adjacent to the surface layer of the internal support mandrel, and forming the A foil strips and the B foil strips in a manner of B, A, B . . . A as the laying sequence, starting from the surface layer of the internal support mandrel; when the layer number of the A foil strips is n, the layer number of the B foil strips is also n, and the value of n depends on the ratio of respective total thickness to respective single layer thickness of the A foil strips and the B foil strips;
   step 4, determining widths of the foil strips: carrying out three-dimensional scanning on the curved component to obtain the shape of surface contour thereof, then performing curvature analysis on each characteristic region of the surface contour thereof to determine the applicable widths of a single layer of A foil strips and a single layer of B foil strips in each characteristic region;
   step 5, establishing a laying process: establishing a laying sequence according to the laying sequence and layer numbers of the A foil strips and the B foil strips determined in step 3, and establishing a laying path of each layer of foil strips according to the thicknesses of a single layer of A foil strips and a single layer of B foil strips determined in step 3 and step 4 as well as the widths of a single layer of A foil strips and a single layer of B foil strips in each characteristic region;
   step 6, pretreating surfaces of the foil strips: pretreating the surfaces of the foil strips before laying of the foil strips; first, scrubbing the surfaces of the A foil strips and the B foil strips with organic solvent, then washing the A foil strips with acid, and washing the B foil strips with alkaline;
   step 7, laying A foil strips and B foil strips: alternately laying the foil strips on the surface layer of the internal support mandrel in sequence according to the laying process established in step 5, so that a laminated foil prefabricated blank with an internal support mandrel is obtained;
   step 8, carrying out bulge forming on the laminated foil prefabricated blank: placing the laminated foil prefabricated blank with an internal support mandrel in a gas bulging forming mould and carrying out bulge forming, so as to make the laminated foil prefabricated blank fully fayed with the gas bulging forming mould to obtain a required bulged component shape;
   step 9, carrying out reaction synthesis and densification treatment on a bulged component: carrying out diffusion synthesis reaction and densification treatment on a bulged component with an internal support mandrel at high temperature and high pressure; diffusion synthesis reaction: synthesis of the first reaction, heating the gas bulging forming mould to 610° C.-650° C., increasing gas pressure to 10-20 MPa, and keeping the temperature and the pressure for 2-5 hours; next, carrying out synthesis of the second reaction, heating the gas bulging forming mould to 1000° C.-1300° C., increasing gas pressure to 10-50 MPa, and keeping the temperature and the pressure for 2-4 hours; densification treatment: heating the gas bulging forming mould to 1000° C.-1300° C., increasing gas pressure to 50-100 MPa, and keeping the temperature and the pressure for 1-5 hours, thereby obtaining a complex curved surface component, wherein the material thereof is Ni—NiAl or Ti—TiAl.

* * * * *